United States Patent
Honda

[15] 3,669,203
[45] June 13, 1972

[54] AIR-COOLING APPARATUS FOR AUTOMOTIVE ENGINE

[72] Inventor: Soichiro Honda, Tokyo, Japan

[73] Assignee: Honda Giken Kogyo Kabushiki, Kaisha, Tokyo, Japan

[22] Filed: July 31, 1969

[21] Appl. No.: 846,476

[30] Foreign Application Priority Data

Aug. 8, 1968 Japan.................................43/55808
Aug. 30, 1968 Japan.................................43/61735

[52] U.S. Cl. .....................180/54 A, 123/41.65, 123/41.67, 237/123 A
[51] Int. Cl. ........................................................B60h 1/16
[58] Field of Search..............180/54 A, 54.4, 64; 123/41.67, 123/41.65; 237/123 A

[56] References Cited

UNITED STATES PATENTS

| 957,253 | 5/1910 | Prescott | 237/12.3 A |
| 1,336,457 | 4/1920 | Wittmann | 123/41.65 |
| 1,655,518 | 1/1928 | Smith | 123/41.65 X |
| 1,766,608 | 6/1930 | Crews | 123/41.67 X |
| 2,766,836 | 10/1956 | Fessia | 180/54 A |

Primary Examiner—Leo Friaglia
Assistant Examiner—Milton L. Smith
Attorney—Waters, Roditi, Schwartz & Nissen

[57] ABSTRACT

A vehicle is provided which has an engine space having an opening arrangement for the admission of air when the vehicle is in motion. Air moves into the engine space along a determinable passage. An engine is arranged in the engine space in intercepting relationship with the passage to be cooled by air flowing therethrough. The engine includes a double wall exterior forming an air jacket into which air is forced under pressure by a blower in order to provide a second source of cooling for the engine. The double wall exterior includes inner and outer walls connected by heat transmitting plates and provided with cooling fins. The air jacket is connected to a passenger space into which heated air is admitted by a shut-off valve. The engine may have cylinders arranged either longitudinally or laterally of the vehicle and the forced air cooling may be provided in such a manner as to be in opposite direction to the natural cooling through the aforesaid space.

8 Claims, 7 Drawing Figures

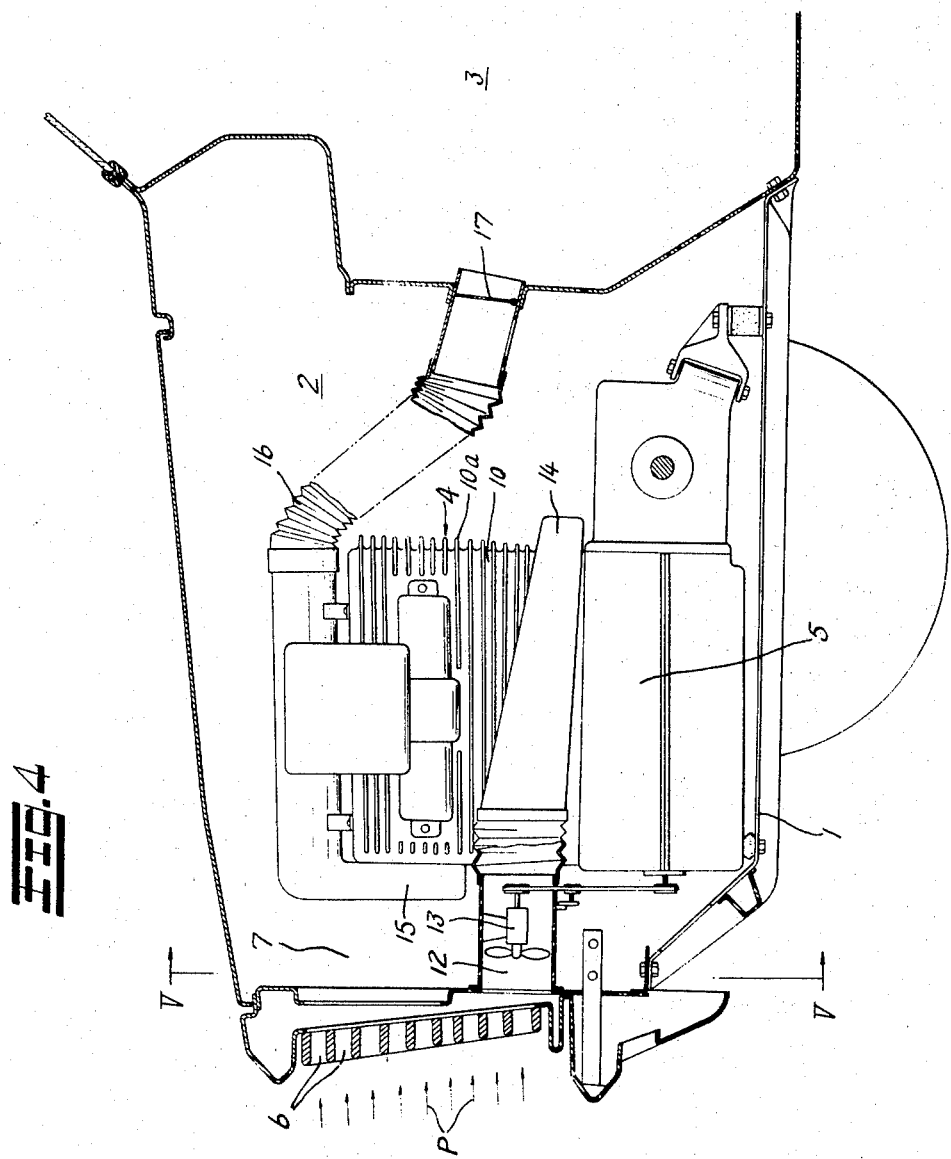

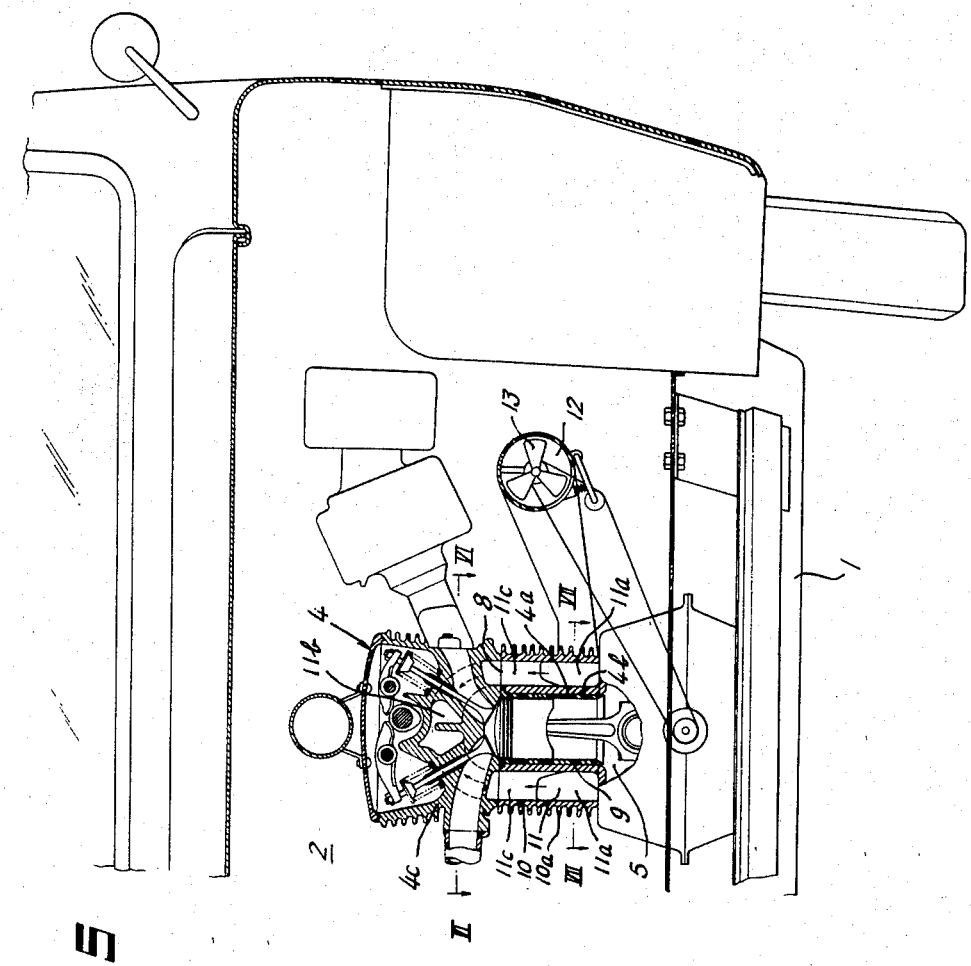

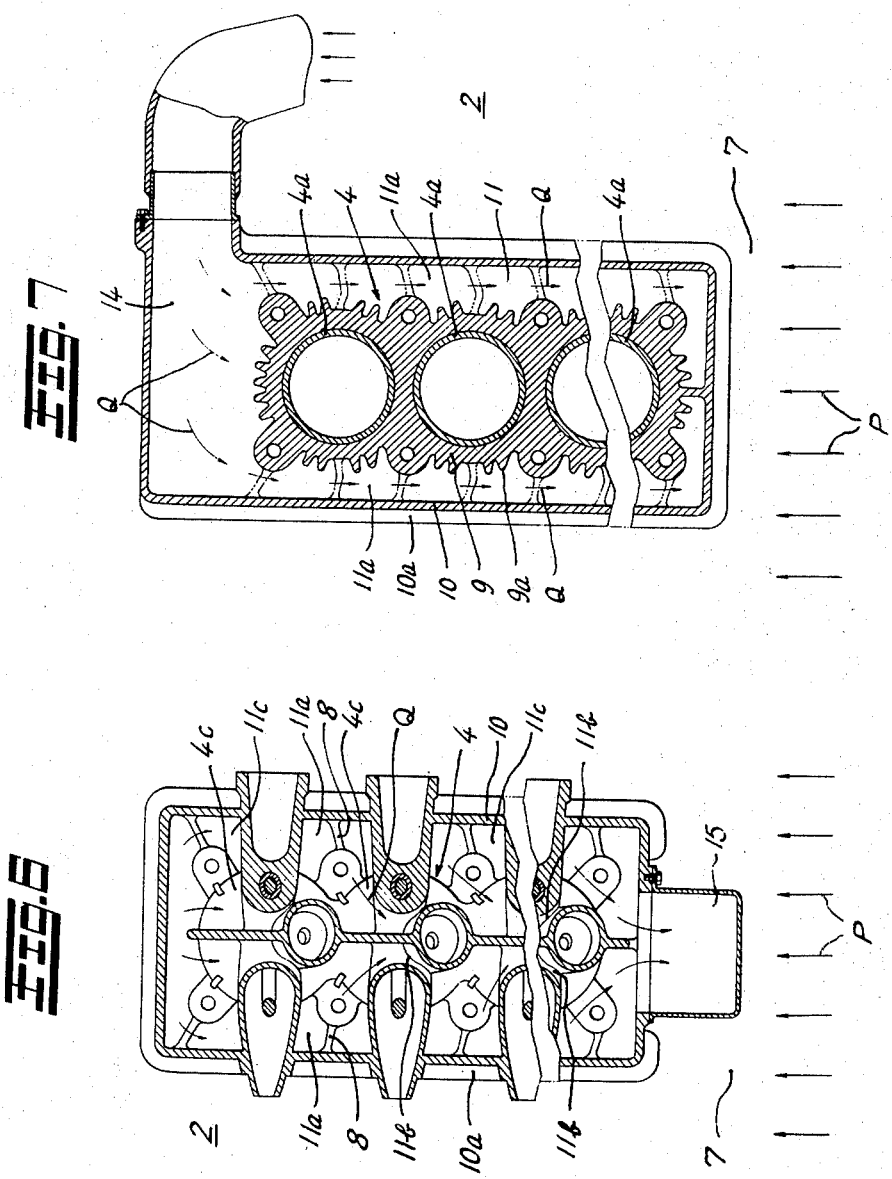

AIR-COOLING APPARATUS FOR AUTOMOTIVE ENGINE

SUMMARY OF THE INVENTION

This invention relates to devices for the air-cooling of internal combustion engines in vehicles such as motor cars and the like.

Apparatus of the invention is characterized in that an internal combustion engine mounted on a car body is positioned within a passage of flowing air resulting from movement of the car body. According to the invention, the outer surface of the engine is formed into an air jacket comprising inner and outer double walls. The air jacket is formed into a passage for forced cooling by air in that the same is brought into communication by a blower with an air intake opening which is open at a position which is deviated from the flowing air passage. The air jacket is preferably such that the inner and outer walls thereof are interconnected through a number of heat transmitting plates.

According to a feature of this invention, the air jacket is in communication at its outlet opening with the interior of a car space and the air intake opening is open to the exterior of an engine space housing the engine. The engine may comprise multiple cylinders arranged side by side and the engine can be so mounted on the car body that its cylinders are aligned in lateral direction or, in other words, in such a manner that the direction of the cylinder alignment is substantially perpendicular to the longitudinal axis of the car body. Alternatively, the engine can be so mounted on the car body that its cylinders are aligned in longitudinal direction or, in other words, in such a manner that the direction of the cylinder alignment is substantially in parallel with the longitudinal axis of the car body. It is preferable in this case that the air jacket be supplied with the air for forced cooling from the rear end thereof so that the direction of the forced cooling air may be in reverse to the direction of the flowing air.

Embodiments of this invention will next be explained with reference to the accompanying drawings.

DRAWING

FIG. 4 is a side view, partly in section, of another embodiment of the invention;

FIG. 5 is a sectional view taken along line V — V in FIG. 4;

FIG. 6 is a sectional view, on enlarged scale, taken along line VI — VI in FIG. 5; and FIG. 7 is a sectional view, on enlarged scale, taken along line VII — VII in FIG. 5.

Figure 1:
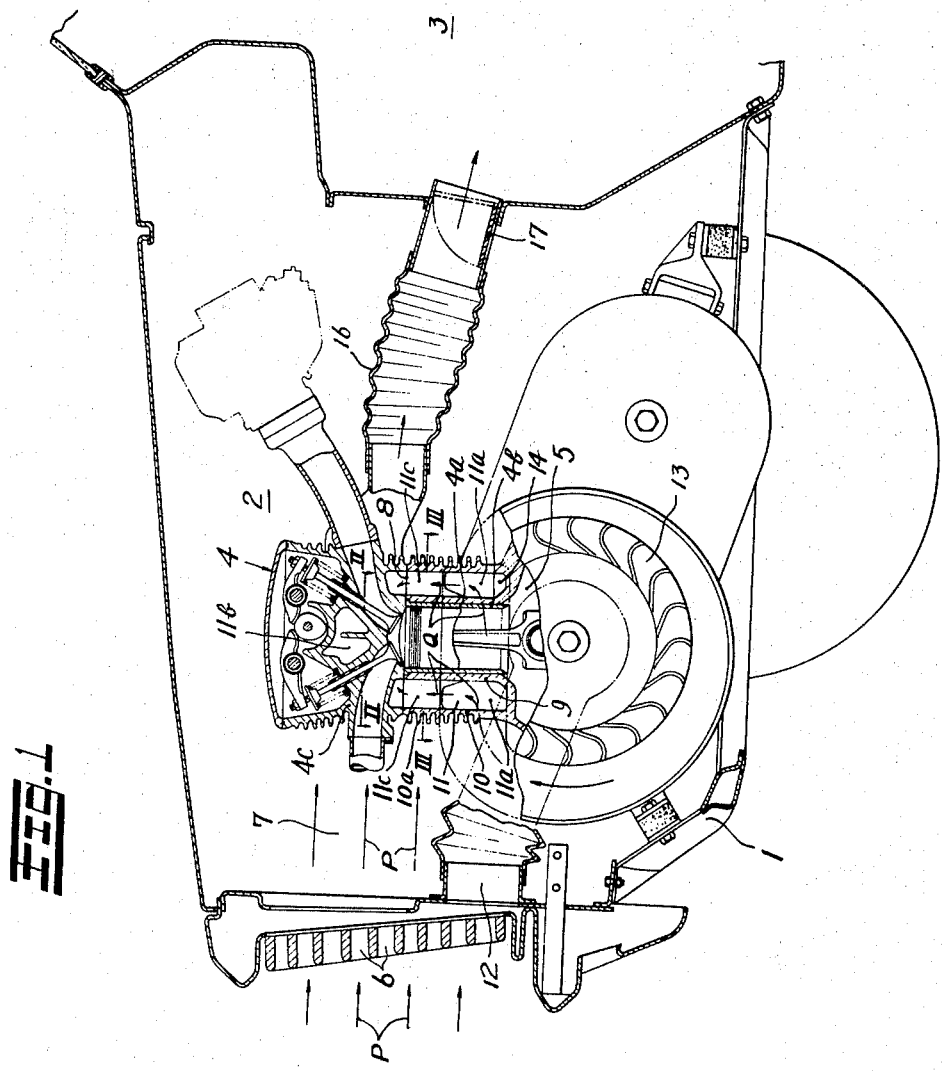
FIG. 1 is a side view, partly in section, of one embodiment of the invention.
Figure 2:
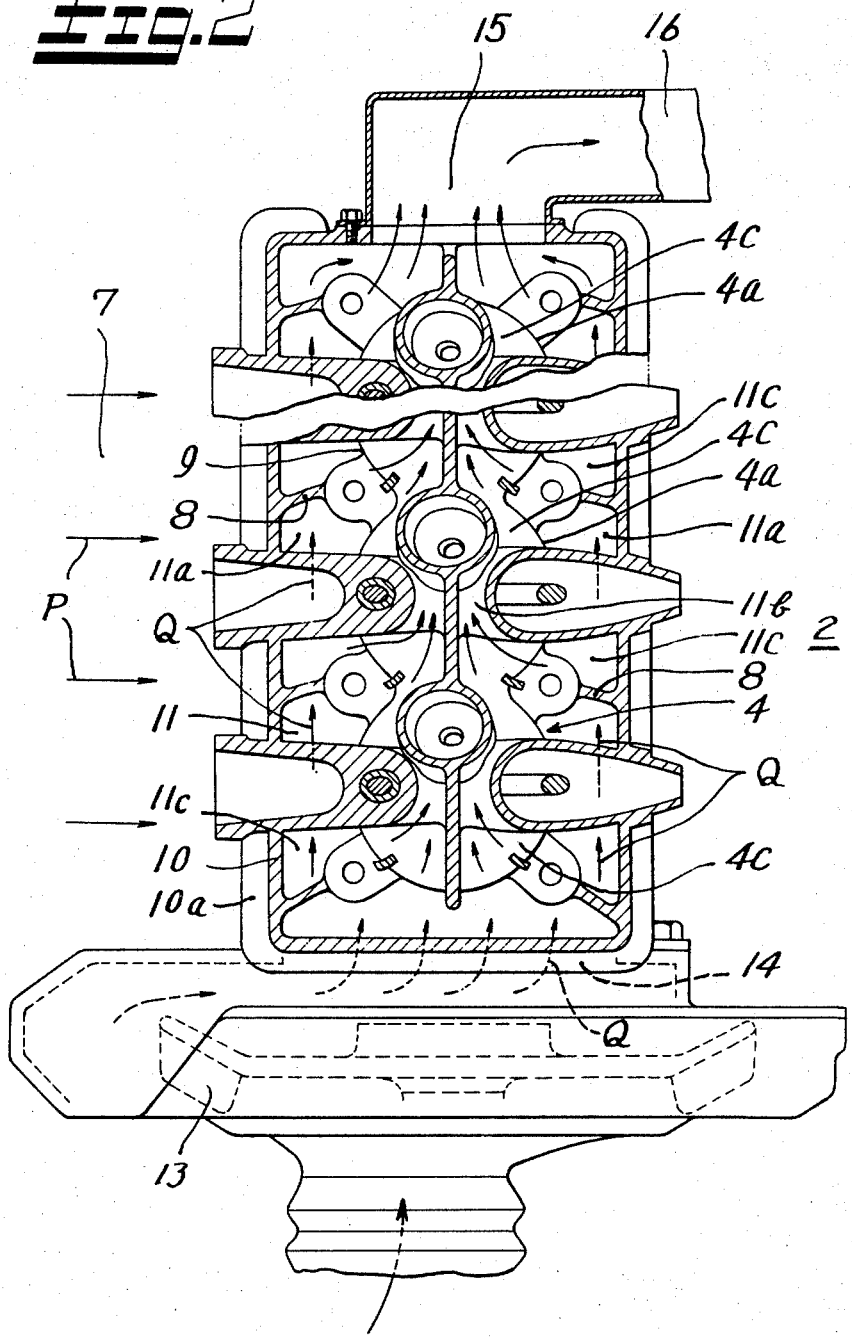
FIG. 2 is a sectional view, on enlarged scale, taken along line II — II in FIG. 1.
Figure 3:
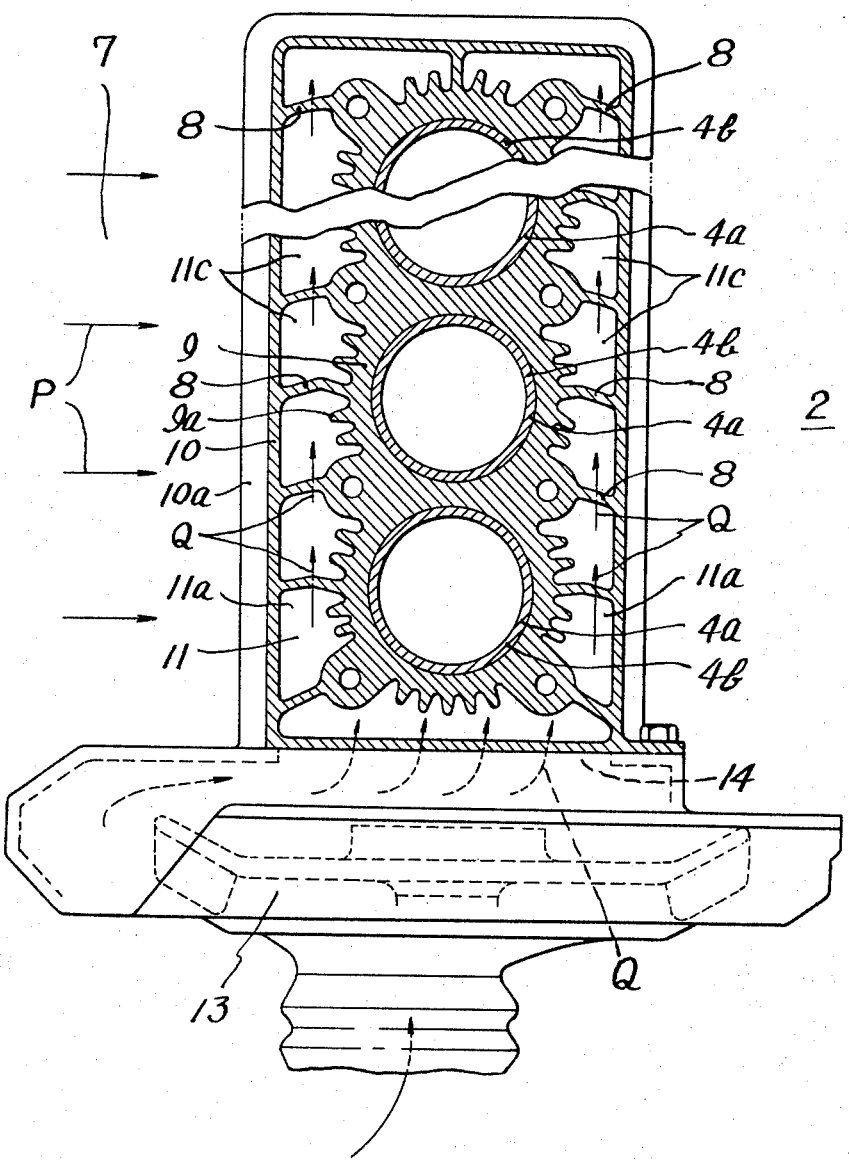
FIG. 3 is a sectional view, on enlarged scale, taken along line III — III in FIG. 1.

In the example illustrated in FIGS. 1 to 3, element 1 is the body or chassis of a motorcar, reference numeral 2 denotes an engine space formed at the front portion of the car, and numeral 3 denotes a vehicle space for passengers formed to the rear of the engine space. An internal combustion engine 4 supplying power for driving the car body 1 is housed in the engine space 2.

The engine 4 comprises a number of cylinders 4a the alignment of which is arranged in the lateral direction as appears in FIG. 3. Each cylinder 4a comprises, in conventional manner, a lower cylinder main body 4b and an upper cylinder head 4c. Element 5 is a crank case formed at the lower side of the engine.

The engine space 2 has a number of openings 6 made in the front wall thereof so that flowing air P resulting from the driving of the car enters the space 2 therethrough and acts on the engine 4 at the front thereof to air-cool the same. In other words, the engine 4 is positioned within the flowing air passage 7 so that the engine is provided with air-cooling by the flowing air P during the driving of the car.

The outer surface of the engine 4 is formed with an air jacket 11 comprising a double-walled structure formed of inner and outer walls 9 and 10 interconnected through a number of heat transmitting plates 8. This jacket 11 is in communication through a blower 13, positioned on the side of the engine 4, with an air intake opening 12 open at any position offset from the flowing air passage 7 so that, due to the operation of the blower 13 driven by the engine 4, the air jacket 11 is supplied with forced air Q from the air intake opening 12 for effecting a forcible air-cooling of the engine 4. In other words, the air jacket 11 is constructed to serve as a passage for forced cooling air Q.

The air jacket 11 has, at its one end, an inlet opening 14 and, at its other end, an outlet opening 15. The interior of the jacket is formed to have, at its bottom, a pair of right and left, horizontally extending side passages 11a and, at its top, a horizontally extending central passage 11b and, at its middle portion, a number of vertically extending passages 11c formed by a number of the heat transmitting plates 8, as shown in FIGS. 1, 2 and 3. Accordingly, the air entering via the inlet opening 14 is divided into right and left streams which flow in the two passages 11a and which, on each side, flow upwardly through the vertical passages 11c. The air streams on both sides then meet in the central passage 11b and flow therethrough to the outlet opening 15. During this travel of the forced air, the engine 4 is cooled thereby.

The air jacket 11 is not limited to the illustrated form and there can be various modifications thereof. Additionally the air jacket 11 can be formed only at the main body portion 4b or only at the cylinder head portion 4c. The jacket need not extend over the whole surface of the engine but extend over only a part thereof.

The air jacket 11 is in communication via its outlet opening 15 with the interior of the car space 3 by means of a duct 16 through a change-over valve 17. Thus, air heated within the air jacket 11 can be led into space 3 for heating the same. If the air intake opening 12 were to be positioned such as to be open to the interior of the engine space 2, the air within space 2, which is more or less contaminated with engine exhaust gas, would be led to the car space 3 where it would be unfit the occupants. Accordingly, the air intake opening 12 is preferably open externally of the engine space 2 for obtaining fresh ambient air.

In the illustrated example, the inner and outer walls 9 and 10 of the air jacket 11 are provided with respective projecting cooling fins 9a and 10a. These fins can be comparatively short in length or can in some cases be entirely omitted.

The operation of this apparatus is as follows: The flowing of air P is brought about within the flowing air passage 7 when the car moves and this air acts on the engine 4 so that the engine 4 is air-cooled thereby at its outer wall 10. Its inner wall 9 is cooled through the heat transmitting plates 8. Additionally, in this case, the blower 13 is driven by the engine 4 so that the air jacket 11 is supplied forcibly with forced cooling air Q from the air intake opening 12. Accordingly, the engine 4 is air-cooled also by forced air.

The flowing air passage 7 and the air jacket 11 (that is, the forced cooling air passage 11) are separated by the outer wall 10 of the air jacket 11 so that the air streams within the two passages 7 and 11 do not interfere with one another. Thus smooth ventilation can be maintained. Additionally, the air intake opening 12 is provided at a position removed from the flowing air passage 7 so that the same can never prevent air from flowing in. Even when the car is stopped, the air-cooling of the engine 4 is continued because the air jacket 11 is forcibly supplied with cooling air. The air within the jacket 11 can be led to the car space 3 for heating of this space. Air intake opening 14 is open externally of the engine space 2, so that the intake air is fresh external air and there can be provided sanitary heating air within the car space 3.

Thus, according to this invention, air-cooling of an engine can be effected by both the naturally flowing air and by forced air-cooling during running of the car and by the forced air-cooling when the car is stopped. Additionally, the flowing air passage and the forced air-cooling passage are separated from one another by the outer wall of the jacket so that the air streams within the two passages can not interfere with one another and so a smooth ventilation can be maintained. Additionally, the air intake opening is arranged to be open at a position removed from the flowing air passage in order not to prevent the flowing air from flowing in. According to another feature of this invention, the forced cooling air is advantageously used for heating of the inner car space in sanitary manner because the intake air is fresh external air.

The above embodiment can be modified, for example, as shown in FIGS. 4 to 7. In this modified embodiment the engine 4 comprising a number of cylinders 4a side by side is mounted on the car body, not in lateral direction as in the preceeding embodiment, but in longitudinal direction (that is, in such a manner that the direction of the alignment of the cylinders 4a is substantially in coincidence with the longitudinal direction or axis of the car body 1 and, further, so that the inlet opening 14 of the air jacket 11 is provided at the rear end of the jacket 11 whereby the forced cooling air supplied from the inlet opening 14 flows through the interior of the air jacket 11 in forward direction, which is in reverse to the direction of the naturally flowing air. Except for the above, this modified embodiment is otherwise the same as the first embodiment.

In the second embodiment, each cylinder is acted upon by air P flowing from front to rear and by the forced cooling air Q flowing from rear to front, in opposite directions to each other. Thus, the engine is strongly cooled at its front portion by the naturally flowing air and at its rear portion by the forced cooling air, whereby the engine is air-cooled substantially uniformly throughout the entire length thereof.

What is claimed is:

1. A vehicle comprising means defining an engine space having an opening arrangement to admit air when the vehicle is in motion, the air moving into the space along a passage therefor, an engine in said space in intercepting relationship with said passage to be cooled by air flowing in said passage, said engine including a double wall exterior forming an air jacket, said double wall exterior including inner and outer walls and heat transmitting plates connected to both walls to join the same together, means having an inlet opening removed and offset from said passage to provide forced air flow through said jacket for further cooling of the engine, means defining a vehicle space for passengers, said engine including vertical cylinders, said jacket having an inlet opening at the bottom thereof and an outlet opening at the top thereof, said jacket having separate side passages formed by said plates, the cooling air traveling upwardly in the jacket through said side passages around the cylinders, the outlet opening of the jacket merging with the side passages, and a duct connecting said outlet opening of the jacket with said vehicle space.

2. A vehicle as claimed in claim 1 wherein the means to provide forced air flow through the jacket includes a blower.

3. A vehicle as claimed in claim 2 comprising cooling fins on said walls.

4. A vehicle as claimed in claim 2 wherein the engine cylinders are in an alignment arranged longitudinally of the vehicle.

5. A vehicle as claimed in claim 4 wherein the air jacket has an inlet opening coupled to said blower, and an outlet open is disposed forwardly of the inlet opening so that the engine is cooled by air flowing through the jacket in opposite direction to the flow of air in said passage.

6. A vehicle as claimed in claim 2 wherein the engine cylinders are in an alignment arranged laterally of the vehicle.

7. A vehicle as claimed in claim 1 comprising a shut-off valve between said air jacket and vehicle space.

8. A vehicle as claimed in claim 1 wherein said inlet opening is divided into two side spaces leading to said side passages, said jacket having a central passage joined to said side passages and leading to said outlet opening whereby the cooling air flows upwardly as streams through the side spaces which then meet in the central passage and flow to the outlet opening.

* * * * *